Oct. 18, 1960   G. S. PLEISS   2,956,758
REEL FOR CLOTHES LINE OR THE LIKE
Filed March 30, 1959
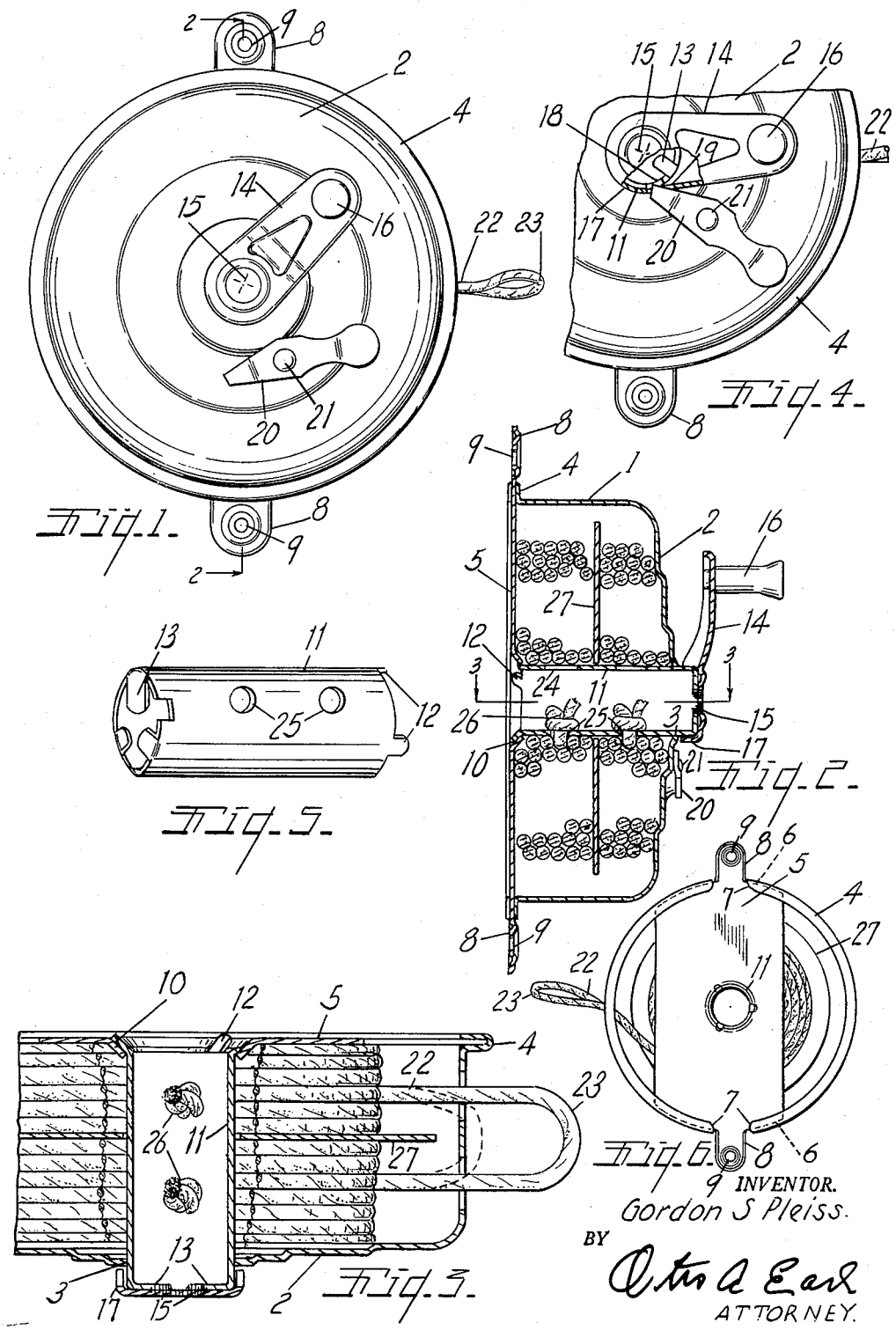
INVENTOR.
Gordon S. Pleiss
BY
Otto A. Earl
ATTORNEY.

United States Patent Office 2,956,758
Patented Oct. 18, 1960

2,956,758

REEL FOR CLOTHES LINE OR THE LIKE

Gordon S. Pleiss, Ludington, Mich., assignor to Handy Things Manufacturing Company, Ludington, Mich.

Filed Mar. 30, 1959, Ser. No. 802,856

7 Claims. (Cl. 242—100.1)

This invention relates to a reel for clothes lines or the like. The main objects of this invention are, First, to provide a reel for a clothes line or the like which is well adapted for use in relatively restricted spaces such as kitchens, bathrooms, and the like.

Second, to provide a line reel which may be attached to a wall or other support and is relatively inconspicuous when so attached, and at the same time one which permits the line to be withdrawn therefrom and its outer end attached to a supporting element spaced from the reel and the line quickly tensioned and held in tensioned position.

Third, to provide a line reel embodying these advantages which may be very economically produced.

Objects relating to details and economies of the invention will appear from the description to follow. The invention is defined and pointed out in the claims.

A preferred embodiment of the invention is illustrated in the accompanying drawing, in which:

Fig. 1 is a front elevational view of a line reel embodying my invention with the spool locking pawl in disengaged position, a line being shown in slightly extended position.

Fig. 2 is a fragmentary view in section on a line corresponding to line 2—2 of Fig. 1, the handle being shown in longitudinal section, the pawl being shown in full lines.

Fig. 3 is a fragmentary view, somewhat enlarged, mainly in section on a line corresponding to line 3—3 of Fig. 2.

Fig. 4 is a fragmentary front elevational view with the handle partially in section illustrating the pawl in keeper engaging position.

Fig. 5 is a front perspective view of the spool prior to assembling with the coacting parts and prior to the connecting of the handle thereto.

Fig. 6 is a rear view with the line partially extended.

The housing or casing of the embodiment of my invention illustrated comprises a cylindrical side wall 1, front wall 2 formed integrally therewith, the side and front wall being a stamping and of rearwardly facing cupped or dished shape. The front wall is provided with a central spool bearing 3. The side wall has an outwardly projecting flange 4 on its inner edge of inwardly facing channel section. The back or rear bearing and mounting plate 5 has curved end edges 6 fittingly received within the flange which is clampingly and retainingly engaged therewith. The flange is provided with oppositely disposed slots 7 through which the attaching ears 8 project, these ears having holes 9 therein adapted to receive attaching screws or the like, not illustrated.

The back plate has a spool bearing 10 therein forwardly offset from the plane of the back plate, the offset being desirably in the form of a forwardly inclined flange. The cylindrical spool 11 is formed of a section of tubing and has ears or lugs 12 on its rear end overlappingly and retainingly engaged within the bearing member 10. On its forward end the spool is provided with inwardly projecting lugs 13 to which the handle shank 14 is secured as by spot welding indicated at 15. The handle is provided with a hand piece 16 and has an inturned flange 17 on its inner end partially embracing the projecting end of the spool. The spool is provided with an opening 18 and the handle is provided with a registering opening 19, these openings defining a keeper with which the pawl 20 pivoted at 21 on the front wall may be engaged to hold the spool against rotation. This pawl is frictionally engaged with the front wall so that it is held in its non-engaging position as illustrated in Fig. 1, or in engaged position as illustrated in Fig. 4. The line 22 of the embodiment illustrated is a single strand or piece and has a loop 23 at its outer end. The spool is provided with laterally spaced pairs of line receiving openings 24 and 25, the opening 24 being dimensioned so that a knot 26 in the inner end of the line may be passed therethrough. The openings 25 are dimensioned so that the knot 26 in the line cannot pass therethrough, but serve to anchor or connect the line to the spool. The line separator disk 27 is sleeved upon the spool and positioned between the two coils of line.

As stated, the embodiment of my invention illustrated is designed for what amounts to two lines, but the separator disk may be omitted and the reel used for a single line or strand. When the line is wound up within the reel the entire unit is quite inconspicuous when mounted on the wall or other support, and so far as it is conspicuous it is attractive in appearance. In use the pawl is adjusted to permit the line to be drawn out of the reel and attached to a suitable support or supports, preferably two supports in spaced relation, and the slack taken out of the extended line by means of the reel, and the pawl adjusted to hold the spool against the unwinding under the load stresses thereon.

In Figs. 1, 2 and 6 the line is not completely wound onto the spool. The loop-like portion projects from the housing, but it will be understood that in practice the line is wound upon the spool until the bight portion 23 of the line is in supported engagement with the casing, as is indicated by dotted lines in Fig. 3. In this position it is not necessary or essential that the pawl be adjusted to keeper engaging position, that is, there is no substantial tendency for the spool to rotate in line unwinding direction.

I have illustrated and described my invention in a highly practical commercial embodiment thereof. I have not attempted to illustrate the modifications or adaptations in the matter of size or design, as it is believed that this disclosure will enable those skilled in the art to embody or adapt my invention as may be desired.

Having thus described the invention, what is claimed as new and desired to secure by Letters Patent is:

1. A clothes line reel or the like comprising a housing including a cylindrical side wall and a front wall integral therewith and having a central spool bearing opening therein, the side wall having an outwardly projecting flange on its rear edge of inwardly facing channel section and having opposed slots therethrough, a back plate having curved edge portions supportingly engaged within said flange and having attaching ears disposed through said slots therein in projecting relation to the casing side wall, said back plate having a forwardly offset conical bearing therein aligned with said spool bearing in said front wall, a tubular spool rotatably mounted in said spool bearings and having outturned tongues on its rear end retainingly engaged with said back plate, said spool having inturned lugs on its front edge and being notched to provide a keeper element, a handle provided with a shank disposed upon and fixedly secured to said inturned lugs at the front end of said spool and having an inturned flange partially embracing said spool and having a keeper opening therein registering with said keeper opening of said spool, a pawl pivotally mounted on the outer side of said front wall and in frictional retaining engagement therewith for retaining the pawl in its keeper engaging or non-engaging adjusted positions, said spool having laterally spaced aligned pairs of line receiving openings therein, one opening of each pair being dimensioned to permit the passage of a knot in a line therethrough and the other to receive a line with a knot therein retainingly disposed within the spool, said casing side wall having laterally spaced line receiving openings therein, and a line separator disk disposed on said spool between said pairs of line openings therein.

2. A clothes line reel or the like comprising a housing including a cylindrical side wall and a front wall integral therewith and having a central spool bearing opening therein, the side wall having an outwardly projecting flange on its rear edge of inwardly facing channel section and having opposed slots therethrough, a back plate having curved edge portions supportingly engaged within said flange and having attaching ears disposed through said slots therein in projecting relation to the casing side wall, said back plate having a forwardly offset conical bearing therein aligned with said spool bearing in said front wall, a spool rotatably mounted in said spool bearings and having outturned tongues on its rear end retainingly engaged with said back plate, said spool having inturned lugs on its front edge and being notched to provide a keeper element, a handle provided with a shank disposed upon and fixedly secured to said inturned lugs at the front end of said spool and having an inturned flange partially embracing said spool and having a keeper opening therein registering with said keeper opening of said spool, and a pawl pivotally mounted on the outer side of said front wall and in frictional retaining engagement therewith for retaining the pawl in its keeper engaging or non-engaging adjusted positions.

3. A clothes line reel or the like comprising a housing including a cylindrical side wall and a front wall integral therewith and having a central spool bearing opening therein, the side wall having an outwardly projecting flange on its rear edge of inwardly facing channel section and having opposed slots therethrough, a back plate having curved edge portions supportingly engaged within said flange and having attaching ears disposed through said slots therein in projecting relation to the casing side wall, said back plate having a forwardly offset bearing therein aligned with said spool bearing in said front wall, a tubular spool rotatably mounted in said spool bearings to project through said front wall and having tongues on its rear end retainingly engaged with said back plate, a handle on the projecting front end of said spool, said spool having a keeper on its projecting front end, a pawl adjustably mounted on said front wall for releasable engagement with said keeper, said spool having laterally spaced pairs of line receiving openings therein, one opening of each pair being dimensioned to permit the passage of a knot in a line therethrough and the other to receive a line with a knot therein retainingly disposed within the spool, said casing side wall having laterally spaced line receiving openings therein, and a line separator disk disposed on said spool between said pairs of line openings therein.

4. A clothes line reel or the like comprising a housing including a cylindrical side wall and a front wall integral therewith and having a central spool bearing opening therein, the side wall having an outwardly projecting flange on its rear edge of inwardly facing channel section and having opposed slots therethrough, a back plate having curved edge portions supportingly engaged within said flange and having attaching ears disposed through said slots therein in projecting relation to the casing side wall, said back plate having a forwardly offset bearing therein aligned with said spool bearing in said front wall, a spool rotatably mounted in said spool bearings to project through said front wall and having tongues on its rear end retainingly engaged with said back plate, a handle on the projecting front end of said spool, said spool having a keeper on its projecting front end, and a pawl adjustably mounted on said front wall for releasable engagement with said keeper.

5. A clothes line reel or the like comprising a housing including a side wall and a front wall having a spool bearing opening therein, the side wall having a flange on its rear edge of inwardly facing channel section and having oppositely disposed slots therein, a back plate having edge portions supportingly engaged within said flange and having attaching ears disposed through said slots therein in projecting relation to the casing side wall, said back plate having a forwardly offset bearing therein aligned with said spool bearing in said front wall, a spool rotatably mounted in said spool bearings to project from said bearing in said front wall and having projections on its rear end retainingly engaging said back plate, a handle secured to the projecting front end of said spool and having an inturned flange partially embracing said spool and having a keeper opening therein, a pawl adjustably mounted on the outer side of said front wall, said spool having laterally spaced aligned pairs of line receiving openings therein, one opening of each pair being dimensioned to permit the passage of a knot in a line therethrough and the other to receive a line with a knot therein retainingly disposed within the spool, said casing side wall having laterally spaced line receiving openings therein, and a line separator disk disposed on said spool between said pairs of line openings therein.

6. A clothes line reel or the like comprising a housing including a side wall and a front wall having a spool bearing opening therein, the side wall having a flange on its rear edge of inwardly facing channel section and having oppositely disposed slots therein, a back plate having edge portions supportingly engaged within said flange and having attaching ears disposed through said slots therein in projecting relation to the casing side wall, said back plate having a forwardly offset bearing therein aligned with said spool bearing in said front wall, a spool rotatably mounted in said spool bearings to project from said bearing in said front wall and having projections on its rear end retainingly engaging said back plate, a handle secured to the projecting front end of said spool and having an inturned flange partially embracing said spool and having a keeper opening therein, and a pawl adjustably mounted on the outer side of said front wall.

7. A clothes line reel or the like comprising a housing including a side wall and a front wall having a spool bearing opening therein, the side wall having a flange on its rear edge of inwardly facing channel section and having oppositely disposed slots therein, a back plate having edge portions supportingly engaged within said flange and having attaching ears disposed through said slots therein in projecting relation to the casing side wall, said back plate having a forwardly offset bearing therein aligned with said spool bearing in said front wall, a spool rotatably mounted in said spool bearings to project from said bearing in said front wall and having projections on its rear end retainingly engaging said back plate, a handle secured to the projecting front end of said spool and having an inturned flange partially embracing said spool and having a keeper opening therein, and a pawl adjustably mounted on the outer side of said front wall and in frictional retaining engagement therewith for retaining the pawl in its keeper engaging or non-engaging adjusted position.

References Cited in the file of this patent

UNITED STATES PATENTS

| 777,926 | Stevens | Dec. 20, 1904 |
| 974,477 | Day | Nov. 1, 1910 |
| 1,378,686 | Krizevicius | May 17, 1921 |
| 2,464,832 | Stuart | Mar. 22, 1949 |

FOREIGN PATENTS

| 516,640 | Canada | Sept. 20, 1955 |